(12) United States Patent
Park et al.

(10) Patent No.: US 8,635,627 B2
(45) Date of Patent: Jan. 21, 2014

(54) METHOD, MEDIUM AND APPARATUS STORING AND RESTORING REGISTER CONTEXT FOR FAST CONTEXT SWITCHING BETWEEN TASKS

(75) Inventors: Jung-keun Park, Yongin-si (KR);
Keun-soo Yim, Yongin-si (KR);
Woon-gee Kim, Yongin-si (KR);
Jeong-joon Yoo, Yongin-si (KR);
Kyoung-ho Kang, Yongin-si (KR);
Chae-seok Im, Yongin-si (KR); Jae-don Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1918 days.

(21) Appl. No.: 11/637,133

(22) Filed: Dec. 12, 2006

(65) Prior Publication Data

US 2007/0136733 A1    Jun. 14, 2007

(30) Foreign Application Priority Data

Dec. 12, 2005    (KR) .................. 10-2005-0121820

(51) Int. Cl.
*G06F 9/46* (2006.01)
*G06F 9/45* (2006.01)
*G06F 9/44* (2006.01)

(52) U.S. Cl.
USPC ........... 718/108; 717/140; 717/141; 717/145; 717/159; 717/161; 712/228

(58) Field of Classification Search
USPC ......................................... 718/108; 712/228
See application file for complete search history.

(56) References Cited

U.S. PATENT DOCUMENTS

| 6,205,467 | B1 | 3/2001 | Lambrecht et al. | |
|---|---|---|---|---|
| 6,609,249 | B2 * | 8/2003 | Kunz et al. | 717/161 |
| 7,313,797 | B2 * | 12/2007 | Sundaram et al. | 718/108 |
| 7,565,658 | B2 * | 7/2009 | Ericsson et al. | 718/107 |
| 7,873,817 | B1 * | 1/2011 | Aloni et al. | 712/235 |
| 2003/0204666 | A1 * | 10/2003 | Wu | 711/100 |
| 2006/0149940 | A1 * | 7/2006 | Mukherjee | 712/228 |
| 2007/0055839 | A1 * | 3/2007 | Hanes et al. | 711/165 |
| 2010/0281471 | A1 * | 11/2010 | Liao et al. | 717/141 |

FOREIGN PATENT DOCUMENTS

| JP | 1-309135 | 12/1989 |
|---|---|---|
| JP | 4-51329 | 2/1992 |
| JP | 6-348509 | 12/1994 |

* cited by examiner

*Primary Examiner* — Abdullah Al Kawsar
(74) *Attorney, Agent, or Firm* — Staas & Halsey LLP

(57) ABSTRACT

A method, medium and apparatus for storing and restoring a register context for a fast context switching between tasks is disclosed. The method, medium and apparatus may improve overall operating speed of a system by increasing the speed of context switching. The method may include adding an update code for updating information of live registers to a task file that includes a code of a task to perform a specified function, converting the task file having the update code added thereto into a run file, updating the information of the live registers with the update code during running of the task using the run file, and storing a live register context according to the updated information of the registers.

20 Claims, 8 Drawing Sheets

METHOD, MEDIUM AND APPARATUS STORING AND RESTORING REGISTER CONTEXT FOR FAST CONTEXT SWITCHING BETWEEN TASKS

CROSS-REFERENCE TO RELATED APPLICATIONS

This application is based on and claims priority from Korean Patent Application No. 10-2005-0121820, filed on Dec. 12, 2005, the disclosure of which is incorporated herein in its entirety by reference.

BACKGROUND

1. Field

One or more embodiments of the present invention relate to a method, medium, and apparatus for improving the speed of context switching and, more particularly, to a method, medium and apparatus for storing and restoring a register context for fast context switching between tasks.

2. Description of the Related Art

A context switch is a computing technique for storing and restoring the state (context) of a CPU, or other device, such that multiple processes can share a single CPU resource. A context switch enables a CPU to perform multiple tasks by switching a context that is a working environment of tasks when the multiple tasks operate in a system. The context is a set of task resources managed by a kernel and execution environments. A context switch is typically an essential feature of a multitasking operating system.

Not only a general system such as a computer and a notebook computer but also a real time operating system (RTOS) of an embedded system such as ARM® and StarCore™ DSP require a context switch for supporting multitasking. Several kinds of information may be included in the context, and particularly, lots of register contexts may be required. An ARM® system has 16 general purpose data registers of 32 bits, and the StarCore™ DSP includes 16 general data registers of 40 bits, 16 general address registers of 32 bits, four offset registers of 32 bits, four modulo registers of 32 bits, four start registers of 32 bits, and four loop counter registers of 32 bits.

In an embedded system such as DSP, the number of registers is increased in order to improve performance, and this causes the number of registers for context storage during context switching to also be increased. Fast context switching is the core of the RTOS performance. However, context switching time is proportional to the number of registers for storing and restoring the contexts. Thus, an increased number of registers will increase contact switching time and accordingly affect RTOS performance.

FIG. 1 illustrates a conventional context switching process, in which context switching is performed between two tasks. Determining whether a task is currently running may be accomplished through a task control block (TCB). In the conventional context switching process, all register contexts are stored in a previous task stack 11, and then a register context of a new task to be run is restored in a new task stack 12. However, if the number of registers becomes large, the size of the register contexts to be stored in the previous task stack 11 and the register contexts to be restored in the new task stack 12 may become excessive. For example, in the StarCore™ system, at least 208 bytes are required. Accordingly, it may impede fast context switching to increase the number of registers in order to increase the performance of the system, and this may in turn disturb the improvement of the system performance.

A register relocation method has also been proposed. Here, register files are partitioned by tasks in advance, and thus no register switch is required during task context switching. However, this method requires large-sized register files, and the number of tasks should be limited in order to obtain a hardware effect. Also, since the entire contexts to be used by tasks are statically determined, it is difficult to apply the method to a dynamic system.

Consequently, a method, medium, and apparatus, which can perform fast context switching even in a system having a plurality of registers, or in a situation where tasks are dynamically created, is desired.

SUMMARY

Accordingly, one or more embodiments of the present invention solve at least the above-mentioned problems occurring in the prior art, and at least one aspect of the present invention is to provide a method, medium and apparatus for reducing time and memory required to store and restore a register context being created during context switching.

At least another aspect of one or more embodiments of the present invention is to improve the overall operating speed of a system by increasing the speed of context switching.

Additional advantages, aspects and features of one or more embodiments of the invention will be set forth in part in the description which follows and in part will become apparent to those having ordinary skill in the art upon examination of the following, or may be learned from practice of the invention.

To achieve at least the above, and other aspects and advantages, a method of storing and restoring a register context for a fast context switching between tasks is provided according to one or more embodiments of the present invention. The method includes adding an update code for updating information of live registers to a task file that includes a code of a task to perform a specified operation, converting the task file having the update code added thereto into a run file, updating the information of the live registers with the update code during running of the task using the run file, and storing a live register context according to the updated information of the registers.

To achieve at least the above aspects, and other aspects and advantages, a system is provided according to one or more embodiments of the present invention. The system includes a live register analysis unit to add an update code for updating information of live registers to a task file that includes a code of a task to perform a specified operation, a code conversion unit to convert the task file having the update code added thereto into a run file, a live register information storage unit to store live information of the registers, and a central processing unit to run the task using the run file, to store information of the live registers in the live register information storage unit by running the update code, and to store a live register context according to the stored information of the live registers to perform context switching on the task.

To achieve at least the above aspects, and other aspects and advantages, at least one medium is provided according to one or more embodiments of the present invention. The medium includes computer readable code to control at least one processing element to implement a method for storing and restoring a register context for a fast context switching between tasks. The method implemented by the medium includes adding an update code for updating information of live registers to a task file that includes a code of a task to perform a specified operation, converting the task file having the update code added thereto into a run file, updating the information of the live registers with the update code during running of the task using the run file, and storing a live register context according to the updated information of the registers.

BRIEF DESCRIPTION OF THE DRAWINGS

These and/or other aspects and advantages of the present invention will become apparent and more readily appreciated from the following description of exemplary embodiments taken in conjunction with the accompanying drawings in which.

DETAILED DESCRIPTION OF EMBODIMENTS

Figure 1:
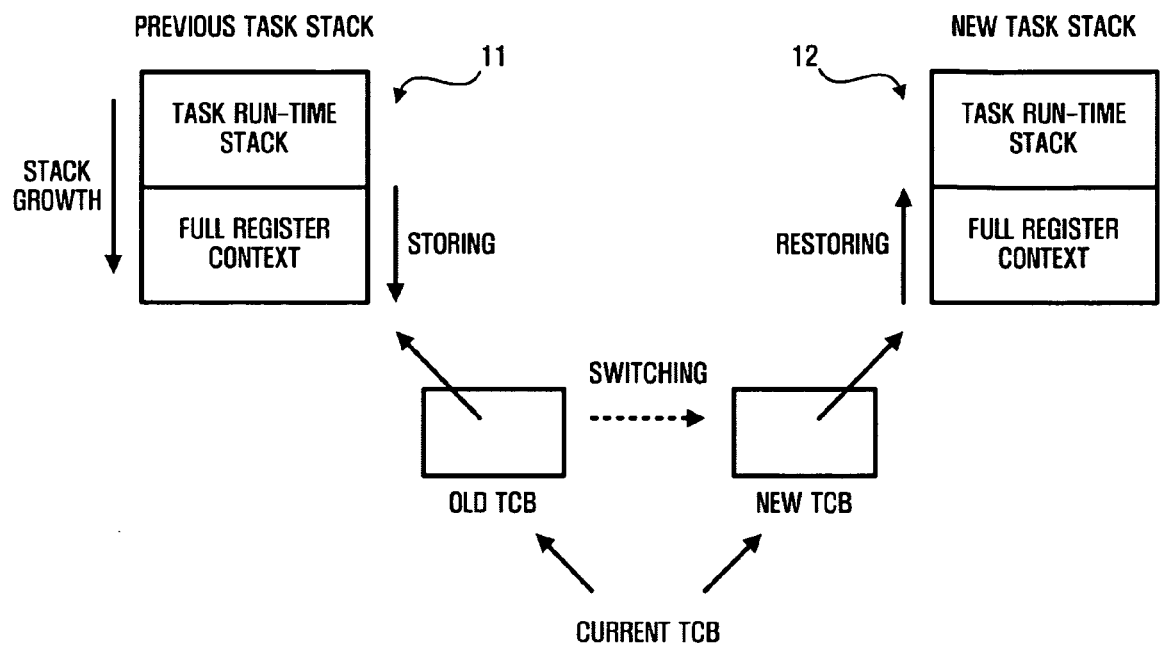
FIG. 1 illustrates a conventional context switching process.

One or more embodiments of the present invention will now be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are specific details provided merely to assist those of ordinary skill in the art in a comprehensive understanding of the invention, and the present invention is only defined by the scope of the appended claims. In the entire description of the present invention, the same drawing reference numerals are used for the same elements across various figures.

Figure 2:
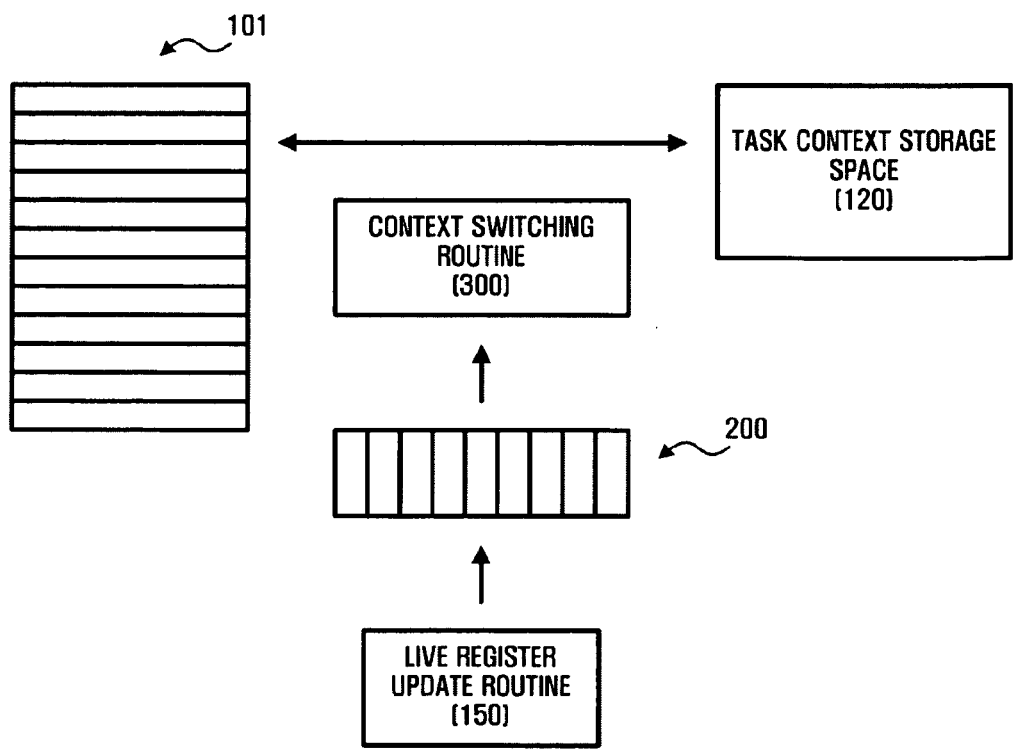
FIG. 2 illustrates an example of storing of only a live register during context switching, according to one or more embodiments of the present invention.

FIG. 2 illustrates an example of the storing of only a live register during context switching according to one or more embodiments of the present invention. As illustrated in FIG. 2, only necessary registers are selectively stored, rather than storing all registers. Dynamically necessary registers are maintained during running of a code, and when context switching is performed, only necessary registers are stored and restored in order to increase the speed of context switching.

The reference numeral "101" denotes whole register files of a task. It is rare for one task to use all the register files. Accordingly, live register information 200 is maintained through a live register update routine 150. When performing the context switching, a context switching routine 300 stores information of the currently used live registers in a context storage space 120 of the task using the information 200.

In one or more embodiments of the present invention as shown in FIG. 2, the concept of a "live register" has been introduced for the context switching. A live register is a register that is currently used by the task and is required to be restored and used in view of the flow of the task when the task, which has entered into a sleeping state, returns to an active or running state. For example, if the first task uses only registers r0 and r1 among registers r0, r1, and r2, only the registers r0 and r1 perform the storing and restoring during the context switching. Also, if the context switching is performed when the first task uses only the register r1 after running for a predetermined time period, only the register r1 performs the storing to increase efficiency.

In FIG. 2, as an example of the live register information 200, live register maps are shown. A determination as to whether to activate registers is updated, using the live register map, while the task is performed. Then, if context switching is performed, both information on necessary registers and map information are stored. When restoring the corresponding task, it can then be determined which registers are to be restored, and what values the registers have.

Figure 3:
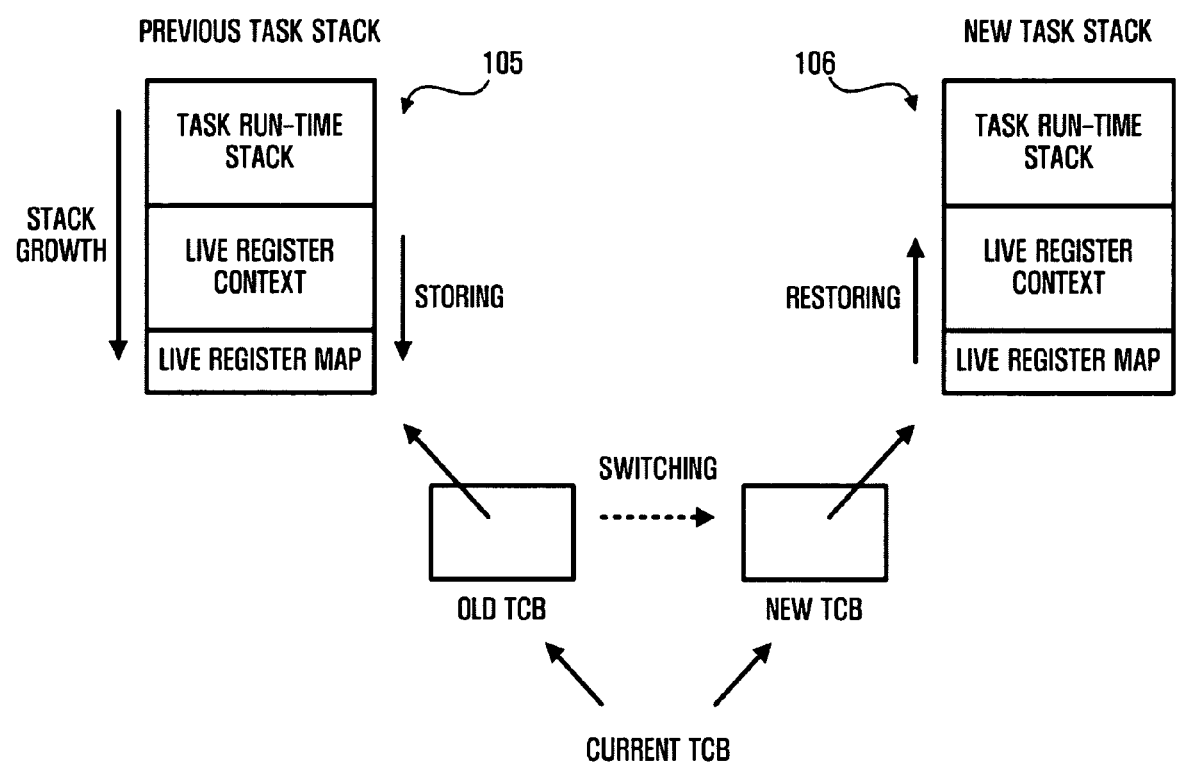
FIG. 3 illustrates the basic principle of storing and restoring of a register context, according to one or more embodiments of the present invention.

FIG. 3 explains the basic principle of storing and restoring a register context according to one or more embodiments of the present invention. Referring to FIG. 3, two tasks exist. The first task has a stack 105, and the second task has a stack 106. In the example, context switching is performed during the running of the first task. Then, after the context switching, the second task is running. In the stack 105 of the first task, a live register context and a live register map of the first task are stored by the context switching. Also, in the stack 106 of the second task, a live register context and a live register map of the second task are restored to run the second task.

The first task and the second task may have different kinds of codes. Even if the first and second tasks have the same code, their contexts are different from each other, and thus their live registers may be different from each other. For example, if the first task uses r0, r1, and r2 as its live registers and the second task uses r2, r3, r4, and r5 as its live registers, although 16 registers are used in all, only three registers and four registers are respectively stored and restored when the context switching is performed. Thus, the speed of the context switching is improved in comparison to a case in which 16 registers are stored and restored.

In the restoring process, the live register context and the live register map are restored using substantially the same storing process. By restoring the live register map, it can be ascertained which registers were used before the context switching. Also, by storing the values of the previously used live registers in the registers, the register values are restored to their prior state, e.g. their state before the context switching occurred.

FIG. 3 illustrates an example in which the live register context and the live register map are stored in stacks. However, a stack is not the only way that the live register context and the live register map may be stored. The live register context and the live register map may also be stored in a specified memory space, and information on the corresponding memory space may be separately managed together with information on the task. When the context of the task is stored and then restored, the live register map and context stored in the memory space are restored, and the control of a process is transferred to the task. As a result, the restored task can be performed in a processor such as a CPU. Also, the restored register values are stored in registers of the CPU, and thus the restored task can be run in the same state as before the context switching.

Figure 4:
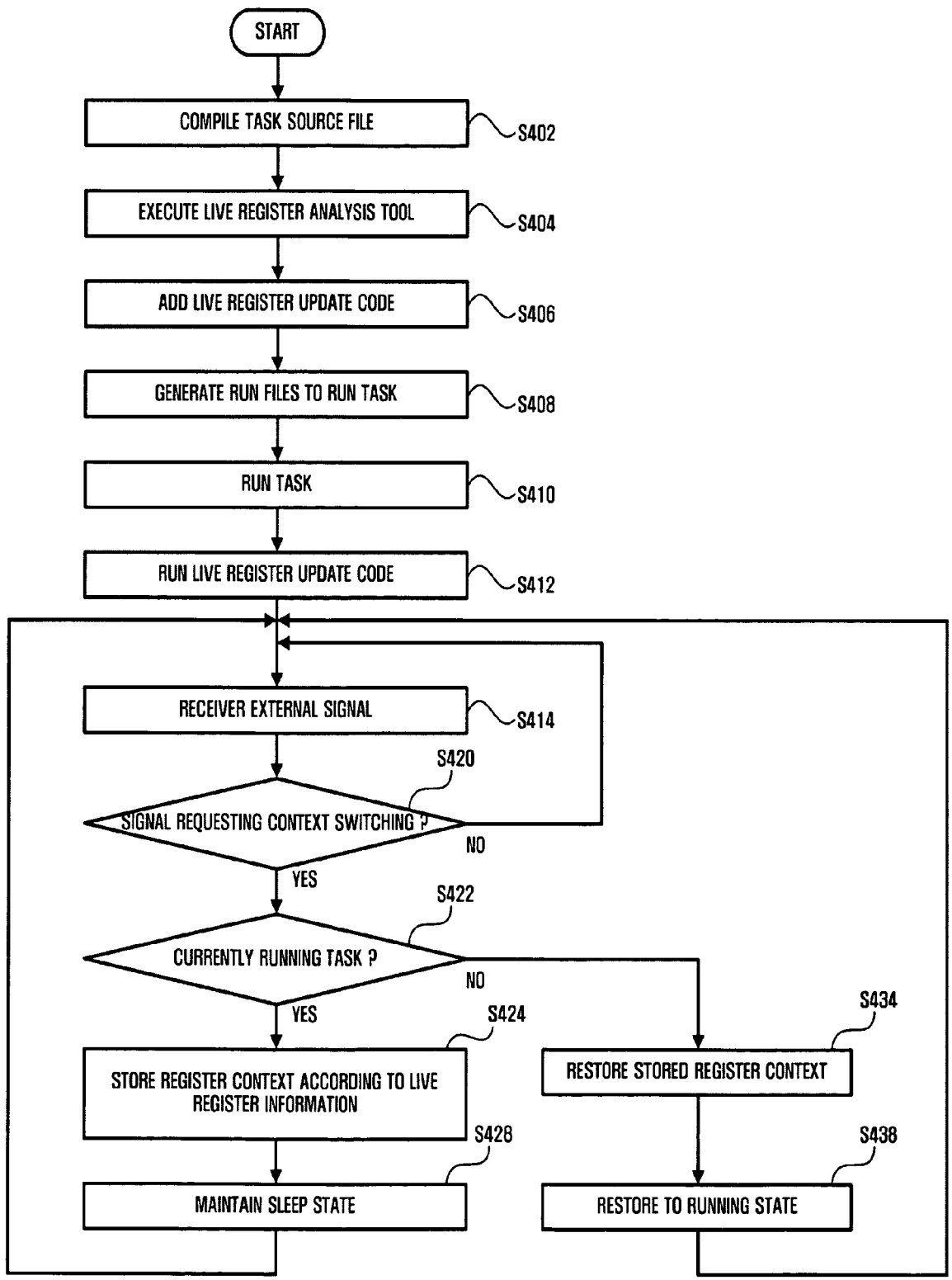
FIG. 4 illustrates a process of inserting a code into a task and storing live registers during context switching after running the task, according to one or more embodiments of the present invention.

FIG. 4 illustrates a process of inserting a code into a task and storing live registers during context switching after running the task, according to one or more embodiments of the present invention.

Generally, a task may be in a running, ready, or sleeping (blocked) state. The context storing is performed when the task state is changed from the running state to the ready or sleeping (blocked) state, and the context restoring is performed when the task state is changed from the ready or sleeping (blocked) state to the running state.

Referring to FIG. 4, in operation S402 a task source file is compiled. As a result of compiling the source file, an object file of an intermediate stage is generated. in operation S404, a live register analysis tool is executed with respect to the object file. In operation S406, the register analysis tool analyzes a use pattern of a register in the object file and adds a live register update code to the object file. In operation S408, a run file capable of running the task is generated from the object file, the run file including the update code. Then, in operation S410, the task is run. During the running of the task, in operation S412, the live register update code added in operation S406 is performed. By performing the live register update code, the currently live registers in the live register map can be determined. During the running of the live register update code, an asynchronous signal such as an interrupt may be received from an external source, as in operation S414. Such an interrupt signal may be synchronously generated by blocking or function call. If the interrupt signal is a signal requesting context switching in operation S420, its process may differ according to the current state of the task. If the task is currently running in operation S422, the context storing is performed through the change of the current running state to the sleeping (blocked) state or ready state. Accordingly, in order to make the task in the sleeping (blocked) state, the context storing is performed. In operation S424, the register context is stored according to the live register information. Then, the task enters into the sleeping (blocked) state in operation S428, so that another task can run.

Alternatively, if in operation S422 the task is not currently running, the task is in the sleeping (blocked) or ready state, and thus the stored register context is restored in operation S434. In this case, only the previously stored live register context is restored to be in the running state in operation S438.

Figure 5:
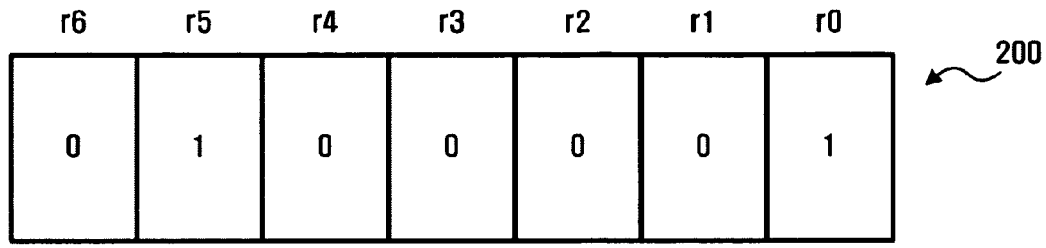
FIG. 5 illustrates a map storing live register information, according to one or more embodiments of the present invention.

FIG. 5 illustrates a map storing live register information according to one or more embodiments of the present invention. Referring to FIG. 5, the register map 200 is a bit map that indicates which registers are live. As shown in FIG. 5, seven bits are used, two bits to indicate that r0 and r5 are live registers, and five bits to indicate that r1-r4 and r6 are not live.

In order to maintain the live register map, specified hardware registers may be used. In this case, existing registers may be reserved to store the live register map. Alternatively, specified registers may be newly provided to store the live register map. Instead of using the registers, a memory address space may be used.

In order to update the live register map, live registers may be updated in the unit of a task, a function, or a basic block. When updating the live registers in the unit of a task, the number of updates is decreased, but the number of registers to be stored is increased. In contrast, if the number of updates is increased, the number of live registers to be stored is reduced, but time for the task to work according to the running of the update code may be lengthened. Accordingly, an adjustment of the number of updates is required, and the updating unit can be selected depending on the working efficiency.

Also, newly added live registers can be analyzed during the compiling. When calling a subroutine, a code that updates the live register information exists in the corresponding subroutine, and thus the live registers can be updated accordingly. As a result, the analysis of the live registers becomes possible independent of the subroutine.

The updating of the live registers can be performed by software and by hardware.

In a part where static analysis is possible, the live registers are directly updated by the analyzed live register map, while in a function call part where static analysis is impossible, the existing live registers are stored and new live registers are added. When returning from the function, the stored live registers can be restored.

The compiler adds a routine that updates and restores the live registers. For example, the live register update and restoring routine can be added to a function start part, a function end part, and a part where the live register set is changed.

Figure 6:
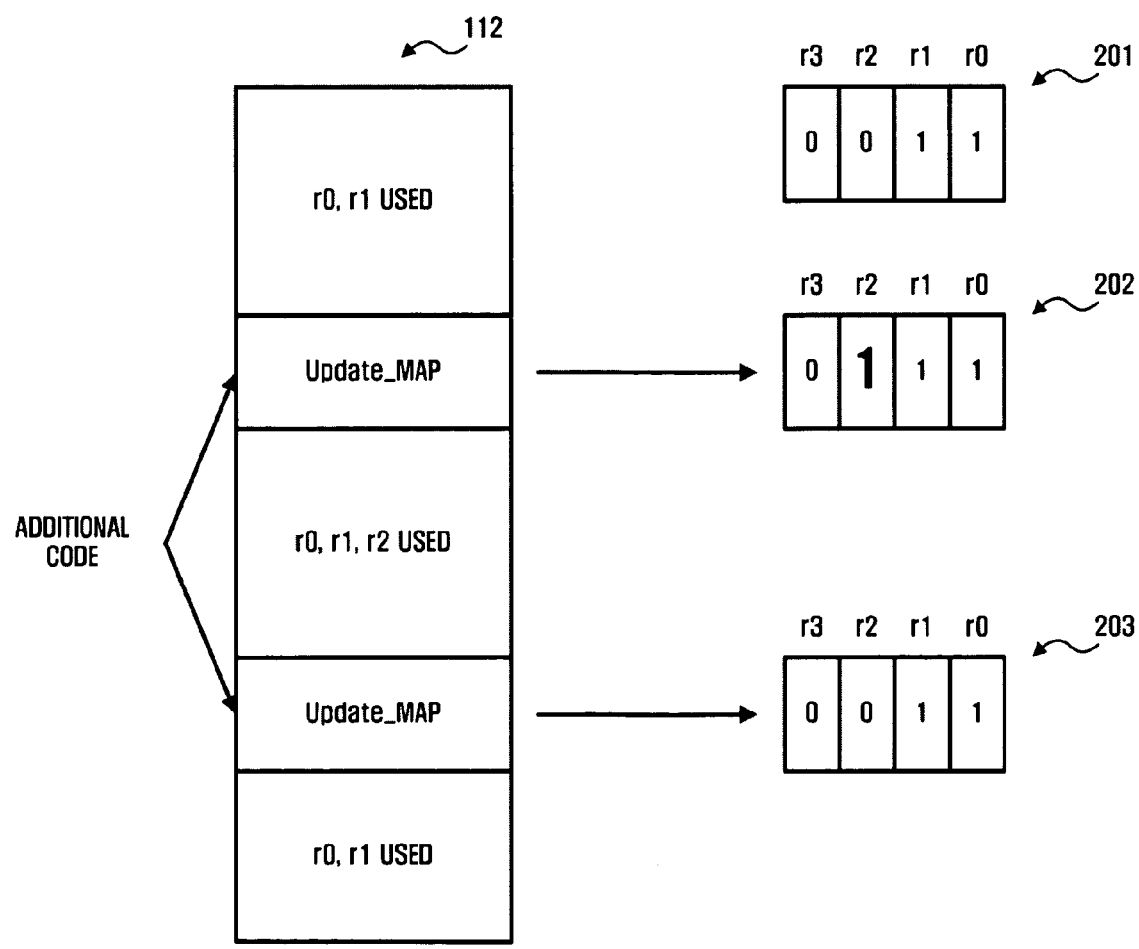
FIG. 6 illustrates updating of live register maps by software, according to one or more embodiments of the present invention.

FIG. 6 illustrates an updating of live register maps by software, according to one or more embodiments of the present invention, in which specified registers are additionally used in specified regions. FIG. 6 shows the updating of the live register map in the case where no function call has been made. In a run code 112 that runs a task, a code that uses registers r0, r1, and r2 exists. Also, an Update_MAP code exists to change live register information at the corresponding time. In the Update_MAP code, live registers or unused registers can be designated.

Registers r0 and r1 are used in the first region of the run code 112. In this case, since registers r0 and r1 are live registers, register parts r0 and r1 of a live register map 201 are set to "1". Also, registers r0, r1, and r2 are used in the second region. Before the start of the second region, an update can be performed so that the register r2 becomes a live register through an Update_MAP code. Through the running of the Update_MAP code, the register part r2 of a live register map 202 is set to "1". In the third region, the registers r0 and r1 are used again, but the register r2 is not used. Before the start of the third region, an update can be performed so as to notify that the register r2 has not become a live register through an Update_MAP code. Through the running of the Update_MAP code, the register part r2 of a live register map 203 is set to "0".

Figure 7:
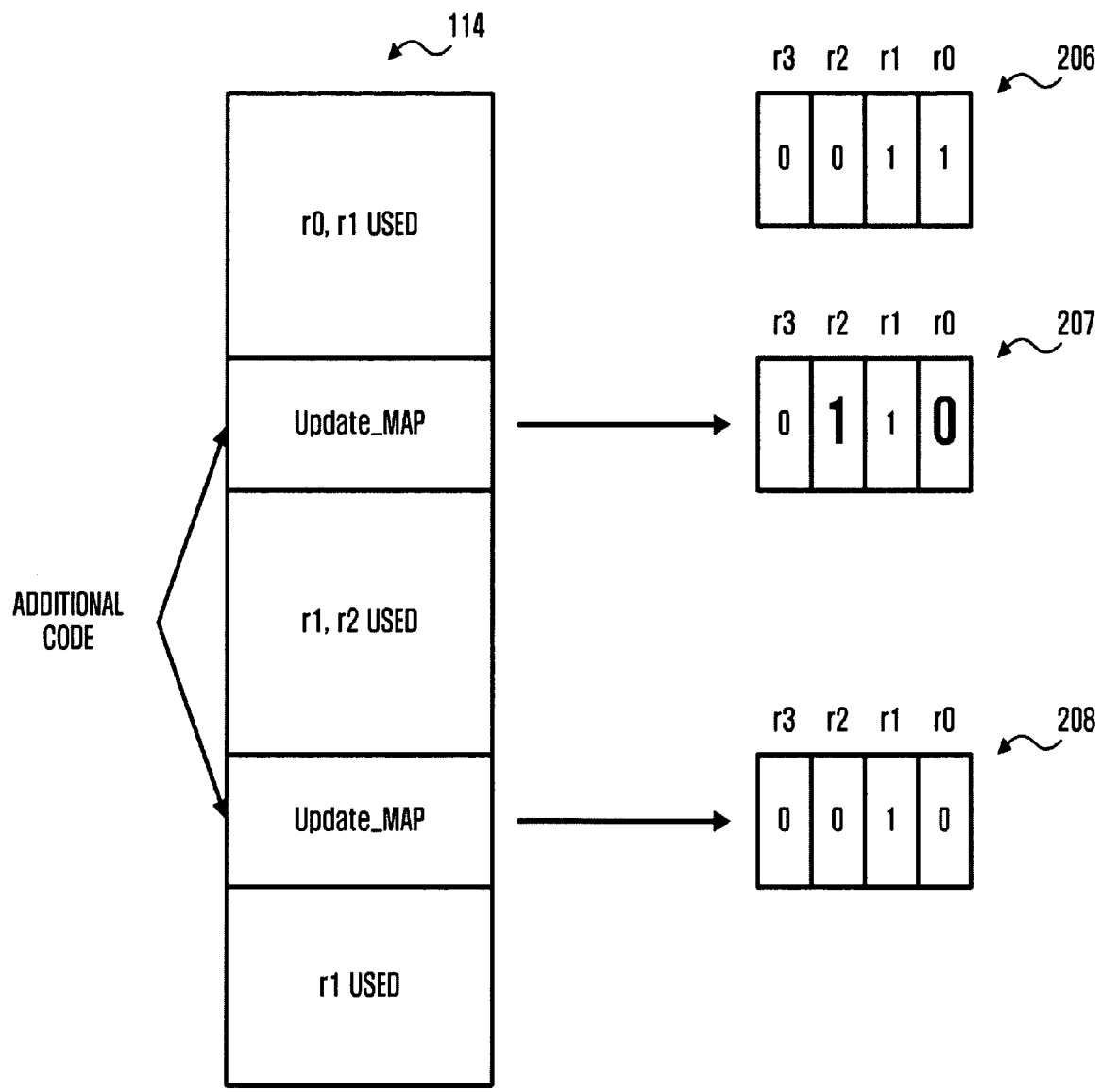
FIG. 7 illustrates updating of live register maps by software, according to another embodiment of the present invention.

FIG. 7 illustrates an updating of live register maps by software, according to another embodiment of the present invention, in which the user of registers is changed every region. FIG. 7 shows the updating of the live register map in the case where no function call has been made. In a run code 114 that runs a task, a code that uses registers r0, r1, and r2 exists. Also, an Update_Map code exists to change live register information at the corresponding time point. In the Update_MAP code, live registers or unused (non-live) registers can be designated.

Registers r0 and r1 are used in the first region of the run code 114. In this case, since registers r0 and r1 are live registers, register parts r0 and r1 of a live register map 206 are set to "1". Also, registers r1 and r2 are used in the second region. Before the start of the second region, an update can be performed so that the register r0 is not used and the register r2 becomes a live register through an Update_MAP code. Through the running of the Update_MAP code, the register part r0 of a live register map 207 is set to "0" and the register part r2 is set to "1". In the third region, the register r1 is used, but the register r2 is not used. Before the start of the third region, an update can be performed so as to notify that the register r2 is no longer a live register through an Update_MAP code. Through the running of the Update_MAP code, the register part r2 of a live register map 208 is set to "0".

Figure 8:
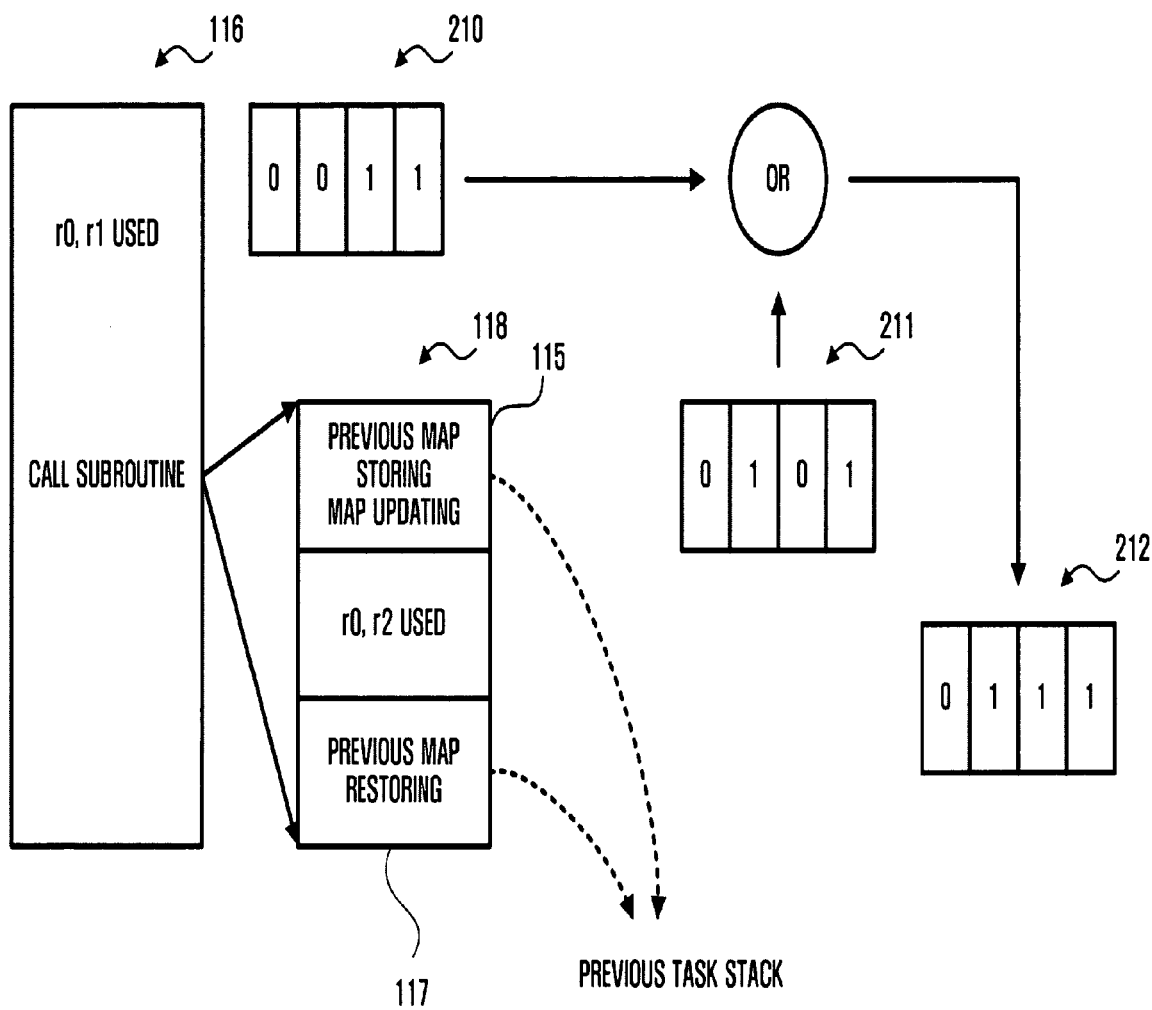
FIG. 8 illustrates updating of live register maps by software, according to still another embodiment of the present invention.

FIG. 8 illustrates an updating of live register maps by software according to still another embodiment of the present invention. FIG. 8 shows the updating of the live register map in the case where a function call has been made. In a task code 116, registers r0 and r1 are used, and in a corresponding live register map 210, registers r0 and r1 are set to "1". If a subroutine is called during running of the code, a code 118 for running another function is performed. The function to be called and executed uses registers r0 and r2, and a corresponding live register map is denoted by "211". In the code of the function to be executed, a live register map of a code 116 that has called the function itself is stored, and a map update code 115 is added to the live register to be used in the function. In the function start part, the code 115 for updating the live register map performs an OR bit operation of a live register map 210 of the called code and a live register map 211 of the function being called and executed. The resultant live register map is denoted by "212".

When the function is completed and the control moves to the code 115 that has called the function, a code 117 that restores live register maps of the called code 116 is added, so that the storing and restoring of the live register map generated due to the function call and return becomes possible.

Figure 9:
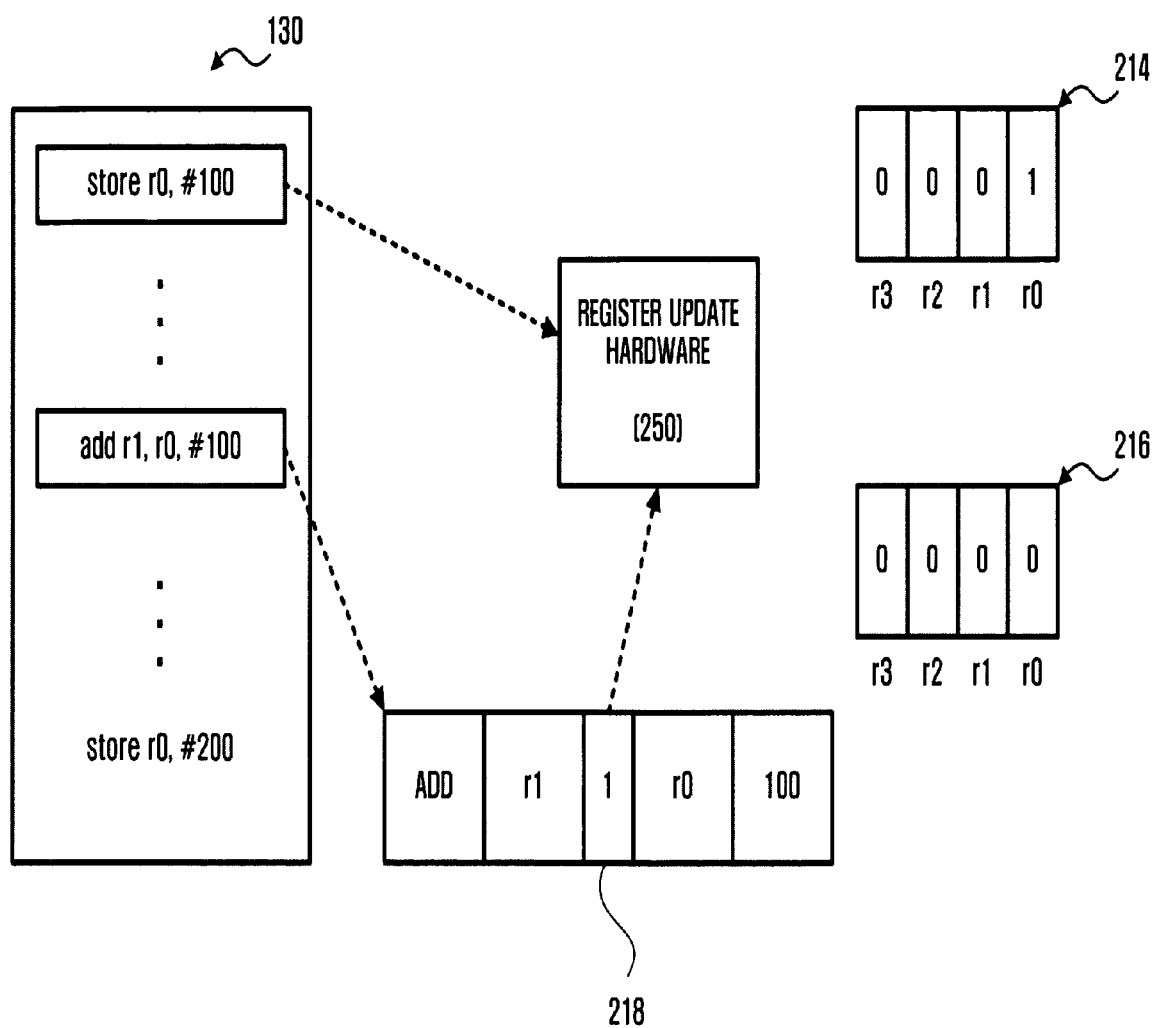
FIG. 9 illustrates updating of live register maps by hardware, according to one or more embodiments of the present invention.

FIG. 9 illustrates an updating of live register maps by hardware, according to one or more embodiments of the present invention.

When using registers, specified values are first stored in the registers, and then the stored values are read and calculated. Accordingly, the register is live for a period from the time when specified values are written in the registers to the time when the values written in the registers are no longer read. Accordingly, if an instruction to store the values in the registers is run, bit map values can be set by register update hardware 250. Also, if register values are not read any more by a compiler, an indication to clear the register map can be made in an instruction to read values of the corresponding registers. For this, instruction encoding and register update hardware is required.

When an instruction "store r0, #100" in a code 130 is performed, a bit r0 of a bit map 214 is set to "1" through register update hardware.

Alternatively, the compiler can search from beginning to end of the code to obtain the code through which the register is finally read. Through the code 130, a value of the $100^{th}$ address of a memory is first stored in the register r0, an ADD operation is finally performed with respect to the stored values, and then the value of the $200^{th}$ address of the memory is again stored in the register r0. Accordingly, if an operation to read the register r0 no longer exists or an instruction to store another value exists after the use of the ADD operation, the ADD operation instruction becomes the last instruction to read the register r0. Accordingly, the compiler can add a bit 218 to clear the bit map of the register r0 to the instruction. This bit can clear the bit r0 of a bit map 216 when the corresponding instruction is run by the register update hardware 250.

Figure 10:
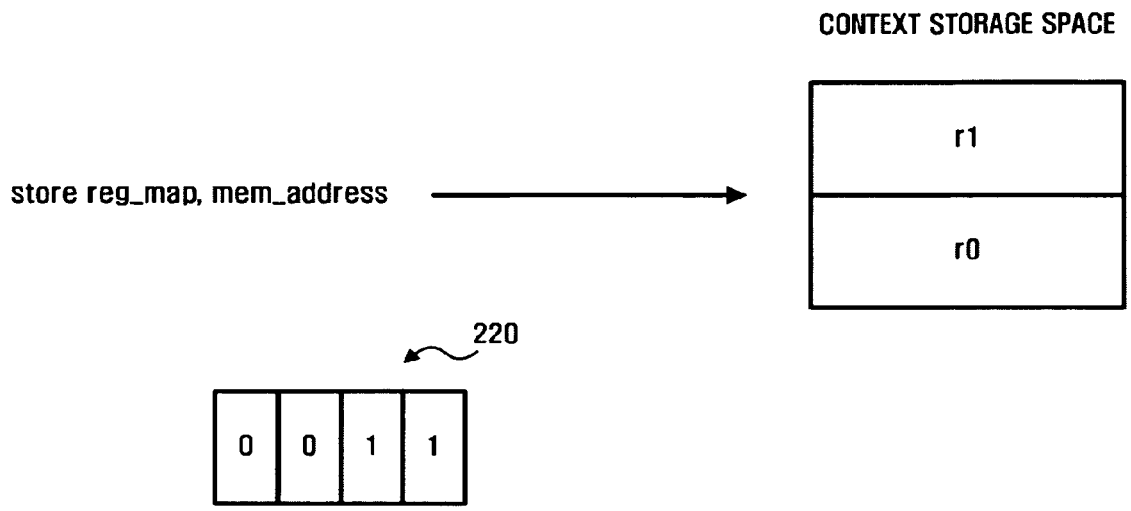
FIG. 10 illustrates performing of context switching using live register maps, according to one or more embodiments of the present invention.

FIG. 10 illustrates a performing of context switching using live register maps, according to one or more embodiments of the present invention.

In order to perform context switching, contexts of registers which are indicated to be live in the live register map are stored. For this, the bit maps are checked one by one on software and only the necessary registers are stored. Also, an instruction to store only registers corresponding to the bit maps may be added through hardware. For example, register information stored in the register map 220 can be stored in a memory at a time through an instruction such as "store reg_map, mem_address".

Figure 11:
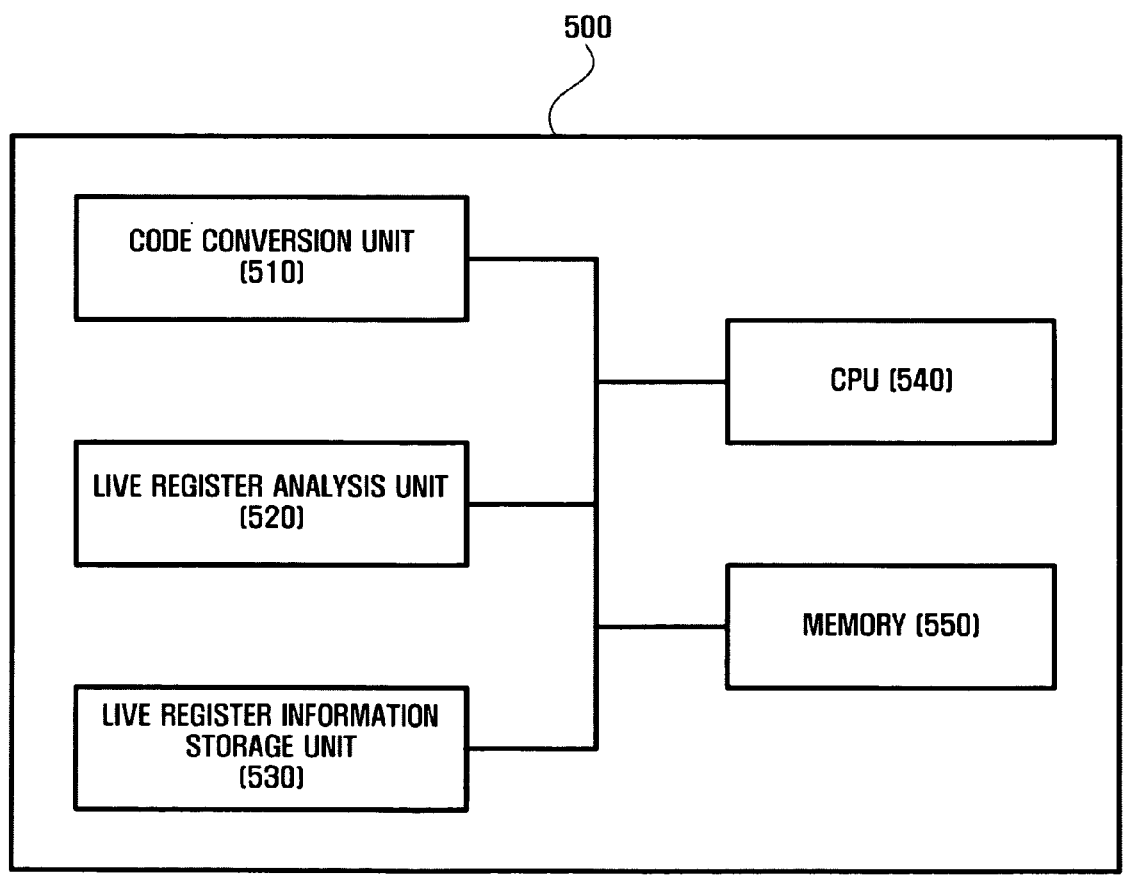
FIG. 11 illustrates the hardware construction of an apparatus, according to one or more embodiments of the present invention.

FIG. 11 illustrates system/apparatus according to one or more embodiments of the present invention. The system can be applied to an embedded system in addition to a general system such as a typical computer and notebook computer.

A live register analysis unit 520 adds an update code for updating the live register information to a task file that performs a specified function. Examples of the code may include the code that performs the function of Update_MAP as shown in FIGS. 6, 7, and 8 and the code to which the code bit 218 is added as shown in FIG. 9. The task file may be a file compiled by a compiler or an assembly code or machine language code.

A code conversion unit 510 converts the task file having the update code added thereto into a run file.

A live register information storage unit 530 provides information on which registers are live, like the above-described live register map.

A central processing unit (CPU) 540 executes the task using the run file and updates the live register information by executing the update code added to the run file. The updated information is stored in the live register information storage unit 530. Also, in order to perform context switching of the running task, the CPU stores the live register context in accordance with the information stored in the live register information storage unit 530. Thereafter, the CPU executes another task, and if the context switching is required, it restores the stored live register context.

The CPU 540 can directly execute the update code, and as shown in FIG. 9, it can update the code with the help of the separate register update hardware 250. Also, these two devices may be combined. A memory 550 stores live register contexts of the context-switched tasks. In addition, the memory 550 loads and runs the run file of the task, and the live register information storage unit 530 may be constructed using a partial region of the memory 550.

As described above, according to the present invention, since only necessary registers can be stored and restored in accordance with the number of registers being used, the size of a memory required for context storing can be reduced and context storing can be performed faster.

In addition, in view of the above, embodiments, the present invention can be applied to dynamically generated tasks or dynamic links.

Also, in embodiments of the present invention, the term "unit", that is, "module" or "table", used herein, signifies, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more CPUs in a device.

One or more embodiments of the present invention will also be described herein with reference to the accompanying drawings illustrating block diagrams and flowcharts for explaining a method, medium and apparatus for storing and restoring a register context for a fast context switching. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create a way to implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may also represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Although a few embodiments of the present invention have been described for illustrative purposes, those skilled in the art will appreciate that various modifications, additions and substitutions are possible without departing from the scope and spirit of the invention as disclosed in the accompanying claims. Therefore, the scope of the present invention should be defined by the appended claims and their equivalents.

What is claimed is:

1. A method for storing and restoring a plurality of live register contexts each including information of a plurality of live registers for a fast context switching between a plurality of tasks, the method comprising:
adding an update code for updating the information of the plurality of live registers to a task file that includes a code of a first task to perform a specified operation;
converting the task file having the update code added thereto into an executable run file;
updating the information of the plurality of live registers stored in a live register information storage unit with the update code during execution of the first task using the executable run file; and
storing a first live register context among the plurality of live register contexts according to the updated information of the plurality of live registers during a context switch of the first task.

2. The method of claim 1, wherein each live register among the plurality of live registers is a register in, or from, which data is stored, or read, by the first task.

3. The method of claim 1, wherein the task file is an object file compiled with a source code prepared to perform the specified operation.

4. The method of claim 1, further comprising:
receiving a signal to request the fast context switching after storing the first live register context; and
restoring the first stored live register context according to the information of the live registers.

5. The method of claim 1, wherein the update code includes an instruction to store in a storage space the live or non-live registers in a specified region of the task file.

6. The method of claim 1, further comprising, storing in a storage space the live registers in a running region of the executable run file.

7. The method of claim 1, wherein, if an instruction to store information in the register is run during running of the executable run file of the first task, information of the register is updated to indicate that the register becomes live.

8. The method of claim 1, wherein the update code has a bit cleared therein to indicate that the register becomes non-live in the case where the register is lastly read from the task file.

9. The method of claim 1, wherein information on whether to use the live registers is stored in a bit map.

10. At least one non-transitory medium comprising computer readable code to control at least one processing element to implement the method of claim 1.

11. The method of claim 1, further comprising:
receiving a signal to request the fast context switching;
storing the first live register context; and
restoring a second stored live register context among the plurality of live register contexts according to the information of the live registers.

12. A system comprising:
a live register analysis unit to add an update code for updating information of a plurality of live registers to a task file that includes a code of a first task to perform a specified operation;
a code conversion unit to convert the task file having the update code added thereto into an executable run file;
a live register information storage unit to store live information of the registers; and
a central processing unit to execute the first task using the executable run file, to update the information of the plurality of live registers in the live register information storage unit during the execution of the first task, and to store a first live register context according to the updated information of the plurality of live registers to perform context switching on the first task.

13. The system of claim 12, wherein each live register among the plurality of live registers is a register in, or from, which data is stored, or read, by the first task.

14. The system of claim 12, wherein the task file is an object file compiled with a source code prepared to perform the specified operation.

15. The system of claim 12, wherein the central processing unit re-performs the first task by restoring the live register context of the first task.

16. The system of claim 12, wherein the update code includes an instruction to store in a storage space the live or non-live registers in a specified region of the task file.

17. The system of claim 12, wherein if the executable run file of the first task calls an operation, the central processing unit stores in the live register information storage unit the information of the live registers in a running region of the operation, which exists in the operation.

18. The system of claim 12, wherein if an instruction to store information in the register is run during running of the executable run file of the first task, the central processing unit stores information in the live register information storage unit which indicates that the register becomes live.

19. The system of claim 12, wherein the update code has a bit cleared therein to indicate that the live register becomes non-live in the case where the live register is lastly read from the task file.

20. The system of claim 12, wherein the live register information storage unit uses a bit map.

\* \* \* \* \*